Figure 4:
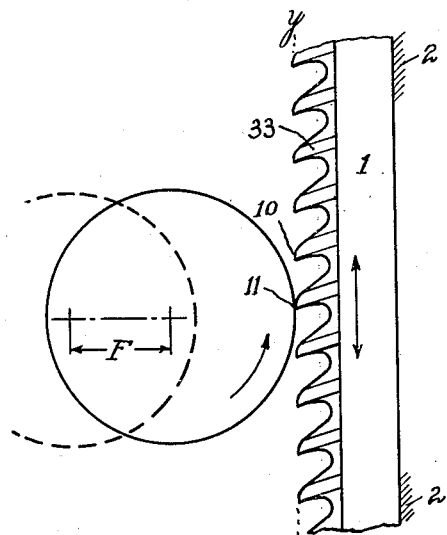

May 5, 1936.　　　F. S. FLOETER　　　2,039,480
BROACHING MACHINE
Filed May 18, 1935

INVENTOR
FREDERICK S. FLOETER
BY
George B. Willox
ATTORNEY

Patented May 5, 1936

2,039,480

UNITED STATES PATENT OFFICE 2,039,480

BROACHING MACHINE

Frederick S. Floeter, Saginaw, Mich., assignor to Wickes Bros., Saginaw, Mich., a corporation of Michigan Application May 18, 1935, Serial No. 22,136

3 Claims. (Cl. 82—2)

This invention relates to improvements in metal forming machines for turning and facing work pieces by broaching.

The general practice in turning engine crank shafts and the like by broaching has heretofore been to rotate the work on a stationary axis and to traverse a long toothed broach bar tangentially past the rotating work pieces in operative engagement therewith, the rotational speed of the work and the longitudinal movement of the broach being such that the work piece made approximately one revolution while in contact with each successive cutting tooth on the broach. Successive teeth were stepped or offset relatively to each other so that each removed a shaving of metal from the surface of the revolving work piece and all the shavings had the same thickness. On account of the stepwise location of the teeth each traveled in a plane of its own, offset from the plane of travel of adjacent teeth by an amount equal to the thickness of the shavings.

In such known machines the work was finished during a single longitudinal movement or traverse of the broach, and to start the turning operation the work piece had to be brought up to the broach while the broach was at the commencement of a working stroke. Idle strokes alternated with working strokes.

To produce a true cylindrical surface on the completed work piece the last few cutting teeth on the broach bar were made without offset, that is, their cutting edges all lay in the same plane so as to remove any slight irregularities from the teeth.

The earlier devices had the disadvantage of not possessing convenient means for adjustably regulating the amount of metal to be removed by each tooth, that is to say, for establishing the appropriate chip thicknesses for different kinds of metal. Moreover, the various offset teeth on a broach were not alike and were usually mounted on the broach bar so that it was a rather difficult and expensive matter to replace worn or broken teeth.

According to my present invention the above mentioned disadvantages are overcome by providing a broach bar in which the teeth are not stepped in relation to each other and they can be all alike. All the teeth move in a single plane instead of in a great number of individual parallel planes as was heretofore necessary in order to give the desired cutting feed. The work piece, instead of being rotated in a fixed axial position, is arranged and operated in my machine so as to move toward the cutting teeth during its rotation. Such approach may be at any predetermined desired feed rate and consequently the amount of total feed-in movement can be regulated according to the amount of metal which it is desired to remove from the work piece. This feature distinguishes from earlier machines wherein a given broach was limited to removing a predetermined maximum thickness of metal or some less amount.

Moreover, my improvement enables the broach to cut during both of its traversing movements or strokes when desired, thus eliminating idle strokes. The work piece is rotated in the direction indicated by the curved arrows, Figs. 1, 2, and 4, at a peripheral speed greater than the speed of linear travel of the broach. This speed differential enables the teeth to cut and clear properly on the up-stroke of the broach, Fig. 4, as well as on the down stroke. Cutting may continue on several successive strokes if necessary, or until the work piece is reduced to the required size, irrespective of reversals of motion at the ends of the strokes. A finished work piece can be removed and a new one inserted without stopping the movements of the broach, thus saving time which was formerly wasted in waiting for a one-way broach to return to starting position.

In view of the foregoing explanation it will be seen that the objects of my invention are, to simplify the design and reduce the expense of constructing machines for such kinds of work; to simplify the arrangement of the broach teeth and render them less expensive to renew; to greatly increase the rate of production of the machine by reducing the time required for putting in and taking out the work; to enable the rate of cut and the depth of cut to be varied at will; and in general to advance the art of broaching in this class of work.

The means by which I attain the foregoing desirable results and others that will appear later in the specifications, although simple, is of great importance, especially in the automotive engine and other industries where accuracy and high rate of economical production are factors.

Figure 3:
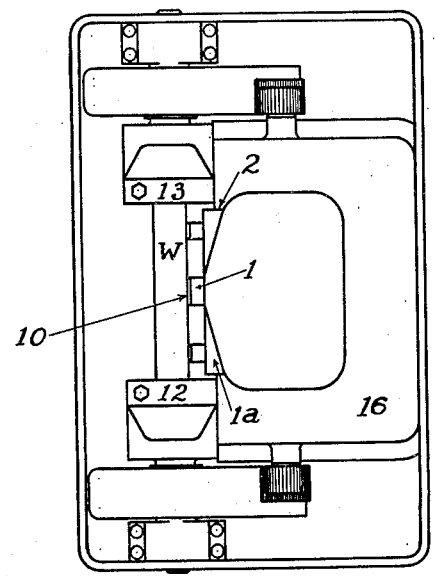
Figure 2:
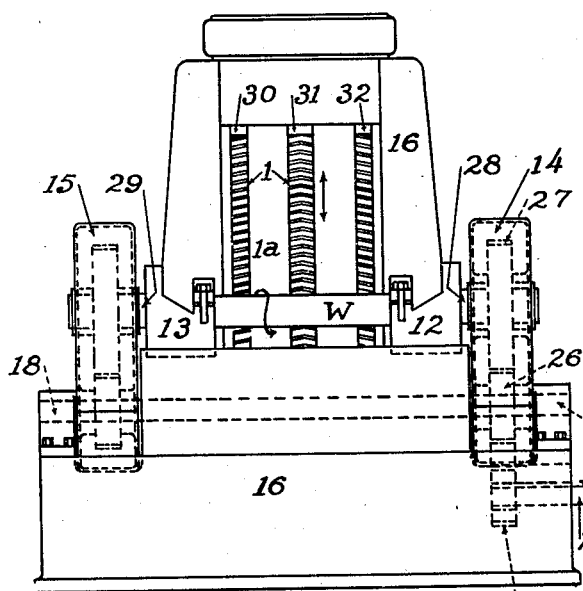
Figure 1:
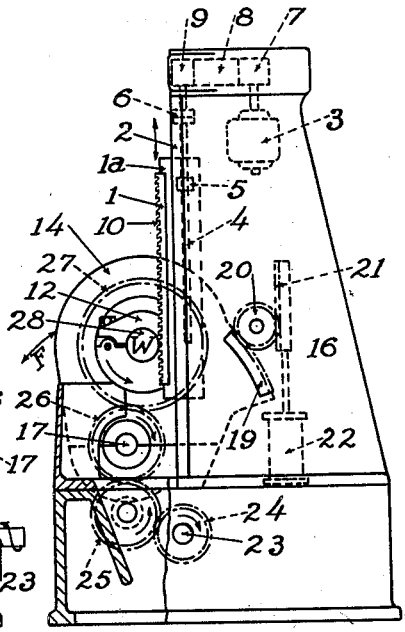

In the accompanying drawing,

Fig. 1 is a side view, partly diagrammatic, of a machine embodying my invention, Fig. 2 is a front view, Fig. 3 is a top plan view, Fig. 4 is a diagrammatic side view, showing the operative relationship between the reciprocatory broach and the work piece.

My improved machine consists of a toothed bar 1 mounted in ways 2 in which it is slidable back and forth in the direction of its length. The broach may be actuated by any suitable driving mechanism. In the machine herein illustrated as a preferred embodiment of my claimed invention the driving mechanism comprises a motor 3 and a train of gears operatively connecting the motor to a screw bolt 4 on which is a threaded traveling nut 5, fixed to the broach bar 1, or to a slidable bar-carrying plate 1a which is mounted in the ways 2 of frame 16. A thrust bearing 6 is provided to take the end thrust of the traversing screw 4.

In operation the motor 3 rotates a pinion 7, an idle pinion 8, and a gear 9. Gear 9 turns the screw 4 and nut 5 moves the broach bar endwise. The rate of traverse is made appropriate to the kind and size of the work piece, its speed of rotation and to the pitch of the broach teeth 10, all according to known practice in the art of broach turning.

The direction of travel of the broach may be reversed at any point in the stroke, as well as at the ends, enabling the cutting teeth to be used equally. That may be accomplished by automatic reversal of the motor 3. The reversing mechanism is not illustrated here, being well known.

The broach teeth 10 are preferably all of equal height, and their cutting edges 11, which extend across the face of the bar 1, approximately at right angles to the direction of its length, move in a common plane y—y, the position of which is fixed by the ways 2. The work piece W, which may be an engine shaft whose bearings are to be turned and whose cheeks are to be faced, is mounted on suitable opposed center bearings, as chucks 12, 13. The axis common to the chucks and the work piece W is kept parallel with the plane y—y defined by the cutting edges 11 of the teeth.

To bring the work piece into and away from engagement with the teeth and to regulate the depth of cut, the following mechanism is preferably employed. The chucks 12, 13 are mounted on movable housings 14, 15 capable of being advanced simultaneously toward the teeth 10 during reciprocation of the broach. In the form shown the housings 14, 15 are pivoted to the framework 16 at 17 and 18.

Forward and back feeding movements, indicated in Figs. 1 and 4 by the arrows F, are imparted to each housing by means of an arcuate toothed rack 19 fixed to the housing and meshing with a pinion 20 which is mounted in fixed bearings on the frame 16. The pinion 20 can be rotated alternately in opposite directions by means of a rack 21 or equivalent gearing actuated by a power source such as an hydraulic cylinder 22 mounted on a fixed support. Movement of the rack up or down, Fig. 1, rotates pinion 20 and thereby rocks the housings 14, 15 to the right or left, thus feeding the rotating work W toward or retracting it from the teeth 10.

The center bearings or chucks 12, 13 and the work piece W are kept in rotation in one direction, as indicated by the curved arrows, by means of a suitably driven shaft 23, a pinion 24 on the shaft, an idle gear 25 mounted in fixed bearings on the frame, and intermediate gears 26 and 27. Gears 26 are rotatable on the pivot shaft 17 of the housings, and mesh with gears 27 which are fixed to stub shafts 28, 29 that carry the chucks 12, 13. The work W is here represented as being a cylindrical piece operated on simultaneously by three broaches 30, 31, 32, on plate 1a.

The details of the mechanism for producing changes in the speed of longitudinal travel of the broach 1, and in the speed of revolution of the work W, and in the speed of feed-in movement of the work toward the teeth 10, are not shown herein because such devices are known to those skilled in the art and their specific structure forms no new part of my invention as set forth in the claims.

By suitably regulating the rate of movement of the chucks 12, 13 toward the teeth 10 the depth of cut per tooth can be varied to suit the size of the work pieces and the kind of material of which they are made, and such feed-in rate can be changed at will by controlling it at cylinder 22.

Cutting can be started on the work piece W at any point on bar 1 along its row of cutting teeth. Also, a finished work piece can be removed from the chucks and a new rough piece can be mounted thereon and fed to the teeth without stopping the reciprocation of the broach bar, thus saving time and greatly increasing the rate of output of the machine.

A finishing cut can be taken that eliminates all of the irregularities of the work piece and thereby produces a perfectly cylindrical product, and this can be done without employing a special set of finishing teeth for that purpose, as has been the usual practice heretofore. To finish, it is only necessary to halt the transverse feeding-in movement of the work W while continuing its axial rotation and continuing also the endwise movement of the broach.

The broach bar 1 may be equipped, as shown, with teeth on its front face only, or its sides may also be provided with cutting teeth 33 for facing off the cheeks or crank arms on engine shafts, or for facing flanges on the work pieces; also these rows of front teeth 10 and side teeth 33 may be shaped at their corners defined by intersecting planes so as to produce filets in the work piece.

Unusual capacity, speed and adaptability to varieties of work are characteristics of this machine and will be appreciated when it is observed that the broach can cut on both strokes, viz. up-and-down in the vertical type of machine shown in the drawing. No time is lost in returning the broach, and no gearing is required for such purposes as in earlier machines. The cut can begin at any position of the broach, so no specific repositioning mechanism is required.

This improved machine is simple in its mode of operation, relatively inexpensive to manufacture and keep in repair, is so designed and organized as to be built exceptionally strong and rugged with a minimum of material. It has great speed and producing capacity, and the broaches, having teeth all of the same height and shape, are less expensive to construct and keep in repair than those in which the teeth are progressively stepped. Moreover, the depth of cut per tooth, being easily controllable and adjustable, as above described, vastly increases the commercial range of the machine over earlier types which did not embody that feature. The slow up-and-down movement of the broach, the relatively rapid rotation of the work piece, at a rate appropriate to produce the requisite cutting speed, and the coincident feeding-in movement of the work piece toward the teeth are all co-operative in attaining the stated objects of the invention.

Although I have shown and described a pair of oscillatable housings for feeding the work piece toward the teeth during the turning operation, it is to be understood that a known slide type of feeding device may be employed, or any equivalent means may be used without departing from the invention as set forth in the claims.

Having thus described my invention, what I claim and desire to secure by Letters Patent is:

1. In combination, a broach bar arranged and actuated for lengthwise reciprocating movement and having spaced teeth whose cutting edges are maintained in a single plane during said movement, opposed center bearings adapted to support between them a work piece whose axis is maintained in parallelism with said plane, rotatable means actuating said bearings and work piece, and feeding means operative to move the rotating work piece axially sidewise toward and away from said teeth during the reciprocation of the broach.

2. A structure as set forth in claim 1 wherein the common axis of said center bearings and work piece is maintained parallel with a plane defined by the cutting edges of the teeth and is also movable sidewise in directions substantially perpendicular with the plane of said cutting edges, and means for varying the rate of such sidewise movement in such a manner as to regulate the rate of cutting.

3. In combination, a broach mounted for lengthwise reciprocatory movement and having teeth spaced apart, the cutting edges of said teeth being disposed in a single plane and arranged and actuated for reciprocating cutting movements in said plane in both directions of said lengthwise travel, supporting chucks for a work piece, powered gearing adapted to impart movements at various rates of speed to said chucks in sidewise direction simultaneously toward the said plane of the cutting edges during the reciprocating movements of said broach in both directions of its travel.

FREDERICK S. FLOETER.